(12) United States Patent
Yamada et al.

(10) Patent No.: US 8,929,665 B2
(45) Date of Patent: Jan. 6, 2015

(54) METHOD OF MANUFACTURING A TEMPLATE MATCHING TEMPLATE, AS WELL AS A DEVICE FOR MANUFACTURING A TEMPLATE

(75) Inventors: Yukari Yamada, Naka (JP); Kyoungmo Yang, Mito (JP); Junichi Kakuta, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/375,131

(22) PCT Filed: May 21, 2010

(86) PCT No.: PCT/JP2010/003412
§ 371 (c)(1),
(2), (4) Date: Nov. 29, 2011

(87) PCT Pub. No.: WO2010/137267
PCT Pub. Date: Dec. 2, 2010

(65) Prior Publication Data
US 2012/0070089 A1    Mar. 22, 2012

(30) Foreign Application Priority Data
May 29, 2009  (JP) ................................. 2009-129789

(51) Int. Cl.
G06K 9/62    (2006.01)
G06K 9/00    (2006.01)
G06T 7/00    (2006.01)

(52) U.S. Cl.
CPC ............ *G06T 7/0044* (2013.01); *G06K 9/6255* (2013.01); *G06T 2207/10056* (2013.01); *G06T 2207/20216* (2013.01); *G06T 2207/30148* (2013.01)

USPC ............................ 382/209; 382/145; 382/152

(58) Field of Classification Search
None
See application file for complete search history.

(56) References Cited

U.S. PATENT DOCUMENTS

| 6,108,089 A | 8/2000 | Shiraishi | |
|---|---|---|---|
| RE39,518 E * | 3/2007 | Toprac et al. | 438/17 |
| 2005/0249395 A1* | 11/2005 | Miller | 382/145 |
| 2005/0281454 A1* | 12/2005 | Miyashita | 382/145 |
| 2006/0126916 A1* | 6/2006 | Kokumai | 382/151 |
| 2006/0147105 A1* | 7/2006 | Lee et al. | 382/151 |
| 2006/0182334 A1* | 8/2006 | Akimoto | 382/145 |

(Continued)

FOREIGN PATENT DOCUMENTS

| JP | 59-083280 | 5/1984 |
|---|---|---|
| JP | 8-043042 | 2/1996 |

(Continued)

*Primary Examiner* — Stephen R Koziol
*Assistant Examiner* — Jonathan S Lee
(74) *Attorney, Agent, or Firm* — McDermott Will & Emery LLP

(57) ABSTRACT

Provided is a method of manufacturing a template matching template, as well as a device for manufacturing a template, by both of which high matching accuracy can be stably ensured without being affected by factors such as process variations. As an embodiment of the above, a method of manufacturing a template matching template, as well as a relevant device, is proposed by both of which a template memorized in advance and an image acquired by a microscope are compared, thereby identifying a desired position, and by which a plurality of images at the identified location are acquired by template matching, and the aforementioned plurality of images are added and averaged, thereby manufacturing a new template.

10 Claims, 4 Drawing Sheets

(56) References Cited

U.S. PATENT DOCUMENTS

| | | | |
|---|---|---|---|
| 2006/0184264 A1* | 8/2006 | Willis et al. | 700/108 |
| 2006/0280358 A1* | 12/2006 | Ishikawa | 382/149 |
| 2007/0064992 A1* | 3/2007 | Teich et al. | 382/141 |
| 2008/0063258 A1* | 3/2008 | Kimba | 382/149 |
| 2009/0041335 A1* | 2/2009 | Matsui et al. | 382/149 |
| 2009/0202139 A1* | 8/2009 | Toyoda et al. | 382/145 |
| 2009/0226075 A1* | 9/2009 | Hiroi et al. | 382/149 |
| 2010/0021041 A1* | 1/2010 | Matsui et al. | 382/141 |
| 2010/0067780 A1* | 3/2010 | Kawaragi | 382/149 |
| 2010/0074516 A1* | 3/2010 | Kawaragi | 382/149 |
| 2010/0189339 A1* | 7/2010 | Amanullah et al. | 382/145 |

FOREIGN PATENT DOCUMENTS

| | | |
|---|---|---|
| JP | 10-038514 | 2/1998 |
| JP | 2002-328015 | 11/2002 |
| JP | 2005-265424 | 9/2005 |
| JP | 2005-300322 | 10/2005 |
| JP | 2007-147366 | 6/2007 |

* cited by examiner (a) REFERENCE IMAGE  (b) SECOND IMAGE  (c) MATCHING IMAGE (a) IMAGE 1  (b) IMAGE 2  (c) IMAGE 3

$$P0[j][i] = \left(\sum_{K=0}^{\text{Image Number}} Pk[j][i]\right)/\text{Image Number}$$
$$= (230+200+140)/3$$
$$= 190$$

(d) AVERAGED IMAGE (a)  (b)  (c)

(a)

(b)

(c)

METHOD OF MANUFACTURING A TEMPLATE MATCHING TEMPLATE, AS WELL AS A DEVICE FOR MANUFACTURING A TEMPLATE

RELATED APPLICATIONS

This application is the U.S. National Phase under 35 U.S.C. §371 of International Application No. PCT/JP2010/003412, filed on May 21, 2010, which in turn claims the benefit of Japanese Application No. 2009-129789, filed on May 29, 2009, the disclosures of which applications are incorporated by reference herein.

TECHNICAL FIELD

The present invention relates to a template matching method, which is a method for finding a particular location, and a device and more particularly to a method of creating a new template using multiple pieces of image data and a device thereof.

BACKGROUND ART

Recently, a pattern formed by the semiconductor process becomes more and more miniaturized, and whether a pattern is processed into a desired shape is inspected using a microscope. A microscope is a device that images a processed pattern and displays it on a display for measuring and inspecting the processed pattern using the image processing technology.

A microscope is classified roughly into two types, one is a microscope that detects a reflected light produced by focusing light (for example, laser beam) onto a sample and the other is a microscope that detects a secondary electron produced by focusing a charged particle beam (for example, an electron beam, an ion beam, etc.) onto a sample. An optical microscope and a microscope using a charged particle beam, though different in operation principle, can employ almost equivalent image processing technology. This is because both types of microscopes use the digital signal processing for producing images, though a high-resolution optical microscope detects a reflected light from a sample with the CCD sensor while a higher-resolution electron microscope detects electrons generated by a sample.

Because an optical microscope that has high resolution or a microscope that uses charged particles are used to measure or inspect extremely miniaturized objects, it is difficult for them to directly identify an object to be measured or inspected (hereinafter simply called an inspection object). Therefore, a method called template matching is used.

Template matching is a method for comparing multiple gradation values, which represent the unevenness of a pattern in a microscope image, with the template graphic image within a predetermined area for identifying a part with a high matching rate. Registering location information and a template in advance allows automatic measurement based on automatic location identification.

Patent Literature 1 describes a technology that enables a template to follow a change in the actual image based on a temporal change in the process condition or the device status by updating the template for each measurement.

Patent Literature 2 describes a technology that updates a template once for a predetermined number of measurements. In addition, Patent Literature 3 describes a method for changing a template, formed based on the design data, to a template based on a SEM (Scanning Electron Microscope) image.

CITATION LIST

Patent Literatures

PATENT LITERATURE 1: JP-A-2007-147366
PATENT LITERATURE 2: JP-A-2005-265424
PATENT LITERATURE 3: JP-A-2002-328015

SUMMARY OF INVENTION

Technical Problem

Because process variations are included in the semiconductor fabrication process, a pattern different from the template sometimes occurs during the measurement of a semiconductor sample of the same type. In that case, the pattern is recognized as a pattern different from the template with the result that a matching error is generated. As described in Patent Literatures 1-3, the generation of a matching error can be suppressed to some degree by updating the template to a higher matching-accuracy template that responds to process variations. However, the SEM image or the pattern, on which a newly registered template is based, is not always accurate, sometimes further decreasing the matching rate between the template and the SEM image (actual image).

The following describes a method of creating a template-matching template and a device for creating a template that is not affected by process variations and ensures high matching accuracy.

Solution to Problem

As one mode to achieve the above object, the present invention proposes a template-matching template creation method and device in which a desired location is identified by comparing a template stored in advance and an image acquired by a microscope wherein multiple images at locations, identified by template matching, are acquired and the average of the multiple images is calculated to create a new template.

By calculating the average of the images of a pattern formed at different process times, a template can be formed that has the average value of the pattern size changes, pattern edge brightness, and pattern noises generated due to process variations. In addition, even if the device condition or the pattern shape changes temporarily, the averaging processing for multiple images suppresses a decrease in template matching accuracy.

Advantageous Effects of Invention

The above configuration allows matching processing to be performed based on a template-matching template that achieves stable matching accuracy not affected by process vibrations.

DESCRIPTION OF EMBODIMENTS

To solve the problem that a general image-recognition template is affected by process variations, the present invention proposes a method and a device for creating a template using images including process variations.

Images including process variations mean that the images include pattern size changes, pattern edge brightness, and pattern noises due to process variations. An image recognition template that is not affected by those process variations is a template having the average values of the pattern sizes, pattern edge brightness, and pattern noises.

The following describes more in detail a method and a device for creating a template, which is not affected by process variations, by averaging the images including process variations.

More specifically, the images of multiple samples of the same pattern, formed under the same fabrication condition, are accumulated (stored) and the average of the images is calculated to create a template that is not affected by process variations.

For example, on a scanning electron microscope capable of continuously measuring and inspecting multiple inspection objects, the existing images acquired by automatic measurement or automatic inspection are used. This eliminates the need for using the device and samples only for the creation of a template, allowing the operator to change the template offline. In addition, because the correction can be made quickly and the operation is not affected by the skill of the operator who makes the correction, a stable template can be acquired simply.

Although an image processing device connected to a scanning electron microscope is used as an example of the template creation device in the description below, the present invention is not limited to this device. For example, an operation device connected to an electron microscope and has an interface that can receive image data transmitted from the electron microscope or an image processing device or an operation device connected to other particle charged beam device or optical microscope may also be used as the template creation device.

First Embodiment

Figure 1:
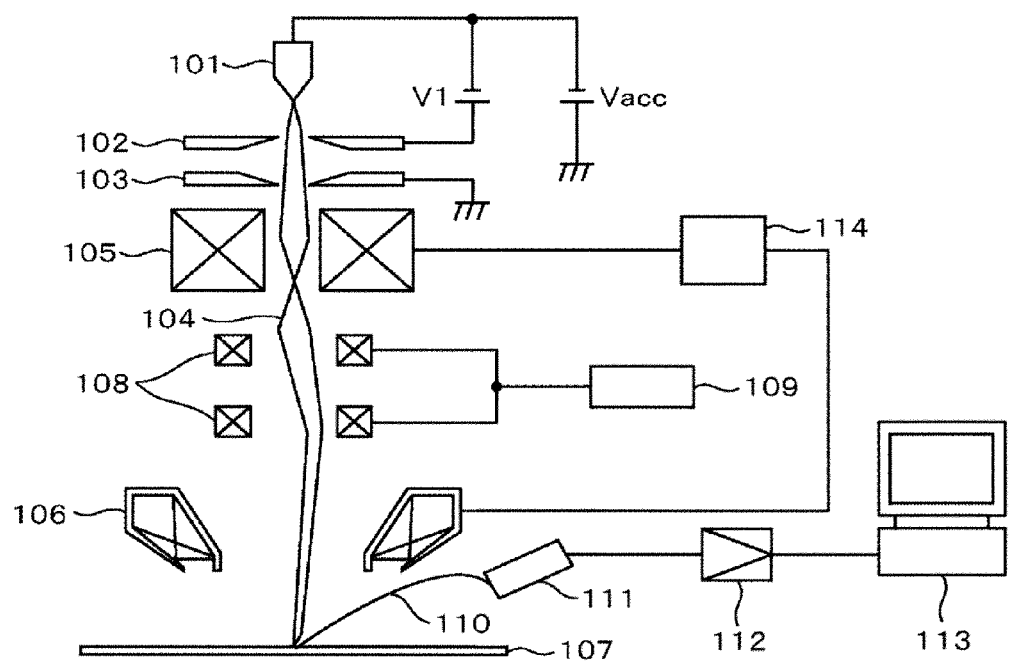
FIG. 1 is a diagram showing the general configuration of a scanning electron microscope.

FIG. 1 is a diagram showing the general configuration of a scanning electron microscope. The electron gun of the electron microscope includes a cathode 101, a first anode 102, and a second anode 103.

A primary electron beam 104 is extracted from the cathode 101 by the voltage V1 (extracting voltage) applied to the first anode 102 and is accelerated by the voltage Vacc (accelerating voltage) applied to the second anode 103. The accelerated primary electron beam 104 travels to the subsequent lens system.

This primary electron beam 104 is focused on a sample 107 as a very small spot by a condenser lens 105 and an objective lens 106, both of which are controlled by a lens control power source 114, for scanning the sample 107 two-dimensionally by means of a two-stage deflection coil 108. The scanning signal of the deflection coil 108 is controlled by a deflection control device 109 according to the observation magnification. A secondary electron 110, generated from the sample by the primary electron beam 104 that scans the sample 107, is detected by a secondary electron detector 111.

The secondary electron information detected by the secondary electron detector 111 is amplified by an amplifier 112 and is displayed on the display of a computer 113. The computer 113 stores the program for creating a template by the method that will be described later.

In the semiconductor device fabrication process, a silicon wafer is processed into a semiconductor device and, therefore, a wafer is used as the sample 107. A circuit pattern during the fabrication is displayed on the screen of the display of the computer 113 to allow an operator to observe a fabrication error of, or a foreign matter on, the circuit pattern.

Some scanning electron microscopes have the function to automatically measure the width of a circuit pattern using the secondary electron information. The processing that uses such image information and the template matching that detects a desired pattern from an image are performed by the operation unit in the computer 113. An image used for the template matching is registered in the storage unit of the computer 113. Automatic measurement is performed based on the registered information, and the acquired image is stored and accumulated in the computer 113.

Figure 2:
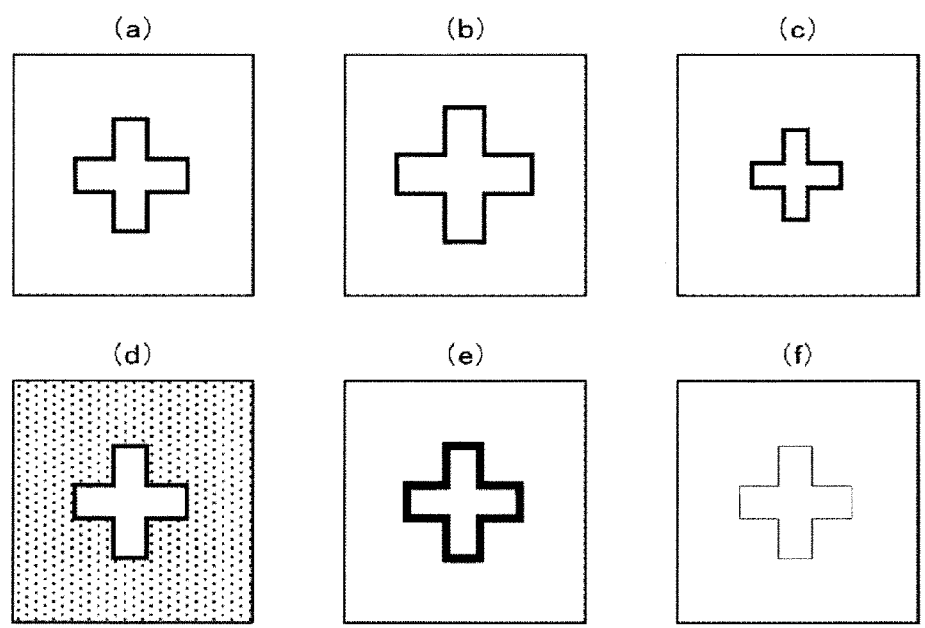
FIG. 2 is a diagram showing an example of sample images that include process variations.

FIG. 2 is a diagram schematically showing images acquired by automatic measurement. When the pattern size in (a) in FIG. 2 is the standard size, (b) shows a larger pattern size and (c) shows a smaller pattern size. There is also a pattern with much noise such as the one shown in (d). Also included in the images are an image with a strong pattern edge such as the one shown in (e) and an image with a weak pattern edge such as the one shown in (f).

The patterns displayed as images in FIG. 2(a) to (f), though created under the equivalent process condition, appear differently because of process variations. This difference also occurs due to a difference in layers. If the difference from the reference pattern becomes larger as shown in FIG. 2(a) to (f) due to process variations, a matching error is generated judging that the image is different from the one registered as the template.

Figure 3:
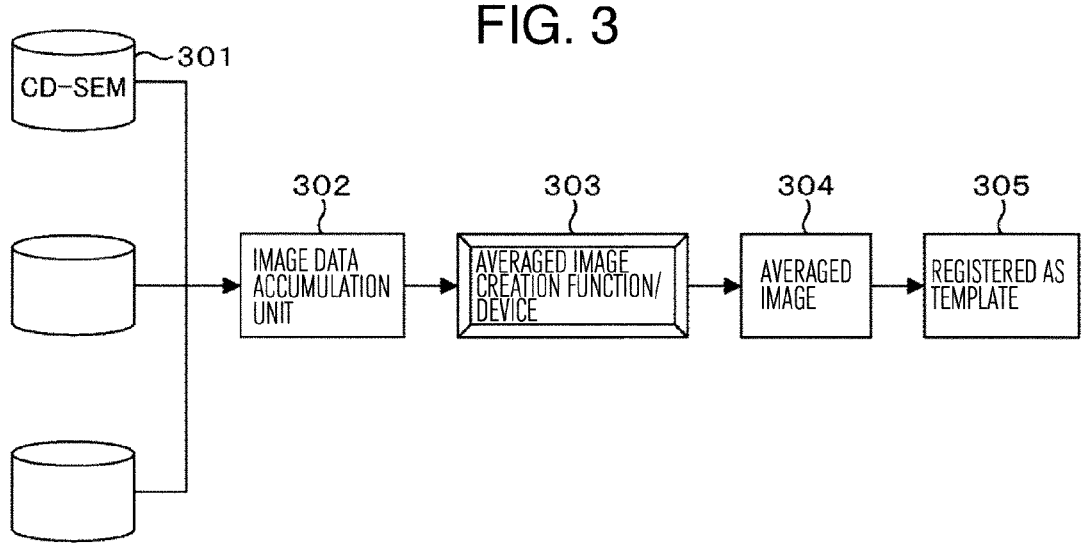
FIG. 3 is a diagram showing the configuration of a scanning electron microscope and a template creation device.

FIG. 3 is a diagram showing an example of the configuration of a scanning electron microscope (for example, CD (Critical Dimension)-SEM 301) and a template creation device. The template creation device includes an image data accumulation unit 302 and an averaged image creation unit 303. In this example, though the template creation device has a configuration in which both image data accumulation unit 302 and averaged image creation unit 303 are included, the present invention is not limited to this configuration. For example, another configuration is also possible in which, with the image accumulation unit 302 built in the CD-SEM 301, the template creation device reads image data, accumulated in the image accumulation unit 302, as necessary. A still another configuration is also possible in which, with image data accumulated in an external storage medium not shown, the template creation device reads image data as necessary.

An image acquired by the CD-SEM 301 is accumulated in the data accumulation unit 302 in the computer 113 shown in FIG. 1 and transmitted to the averaged image creation unit 303 as necessary to allow the averaged image creation unit 303 to perform the image averaging processing. An averaged image 304 created by the averaged image creation unit 303 is transmitted to, and registered in, the CD-SEM 301 as a new template.

Figure 4:
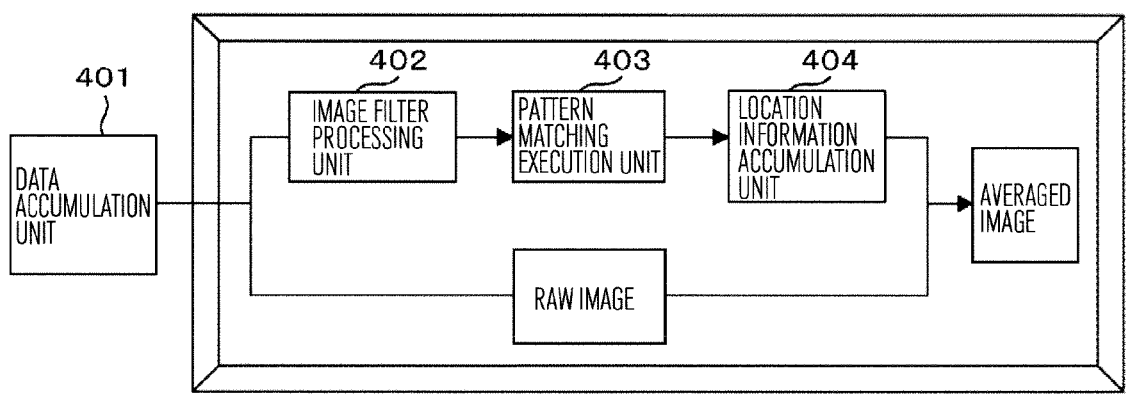
FIG. 4 is a diagram showing the detail of an averaged image creation unit.
Figure 5:
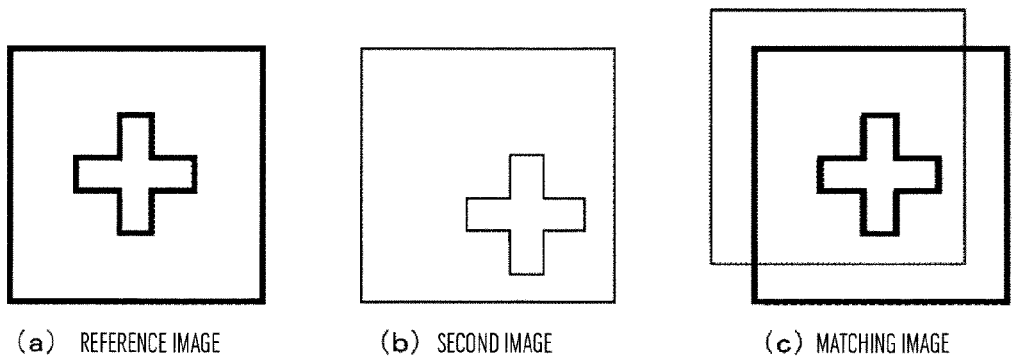
FIG. 5 is a diagram showing an example of finding a difference among multiple images through matching.

The following describes in detail the averaged image creation unit 303, shown in FIG. 3, with reference to FIG. 4. First, an image filter processing unit 402 performs image processing for the image data (raw image for which image processing is not yet performed), accumulated in a data accumulation unit 401 (302 in FIG. 3), to emphasize the pattern edge and to reduce the pattern noise. This processing leads to an increase in pattern matching accuracy. Next, a pattern matching unit 403 performs matching processing for the images for which the image filter processing has been performed. In the matching processing, the pattern matching unit 403 performs matching processing for each image with the first image as the reference to acquire the amount of difference of each image from the first image. The following describes the difference amount acquisition method with reference to FIG. 5.

With the first image in FIG. 5(a) as the reference, the matching processing is performed for the second image, shown in FIG. 5(b), based on the pattern information. By performing the matching processing in this way, the amount of difference of the second image shown in FIG. 5(b) from the first image shown in FIG. 5(a), the reference image, is acquired as the pattern location information (coordinates). The pattern location information (coordinates) produced in this way is saved in a location information accumulation unit 404. Similarly, the pattern location information (coordinates) is acquired for the remaining images with the first image, shown in FIG. 5(a), as the reference, and the acquired pattern location information is saved in the location information accumulation unit 404. Using the pattern location information (coordinates) saved in the location information accumulation unit 404, the averaging processing is performed for the raw images, saved in the data accumulation unit 401, to allow an averaged image to be created with no pattern difference even when the raw images are used.

Figure 6:
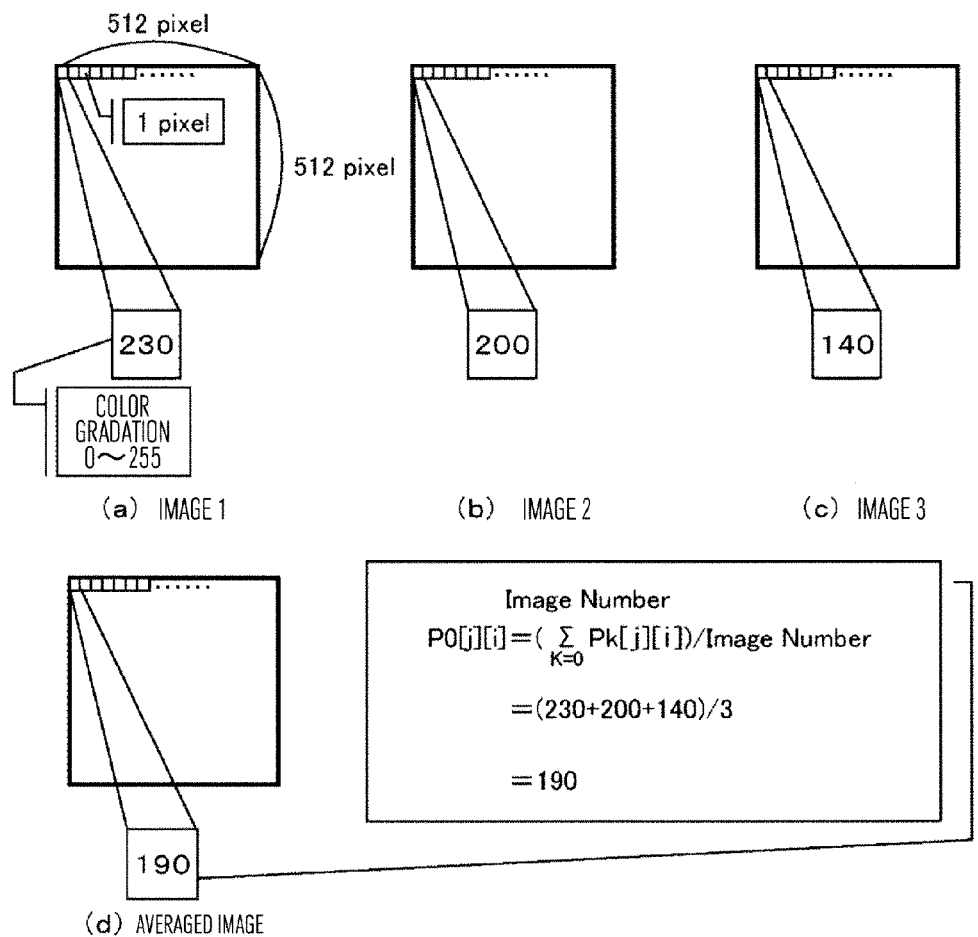
FIG. 6 is a diagram showing the outline of averaging processing among multiple images.

The following describes the averaging processing with reference to FIG. 6. An image acquired by a scanning electron microscope is composed, for example, of 512 pixels×512 pixels. For each pixel, there are 0-255 color gradation levels for forming an image. An averaged image is created by calculating the average of color gradations for each pixel at the same location.

For example, when the averaged image of the three images in FIG. 6(a), (b), and (c) is created under the condition that the gradation of the first pixel in FIG. 6(a) is 230, the gradation of the first pixel in FIG. 6(b) is 200, and the gradation of the first pixel in FIG. 6(c) is 140, the gradation of the first pixel of the averaged image in FIG. (d) is 190. The averaged image is created by calculating the average in the same way for each of all 512 pixels, that is, the second pixel, third pixel, and so on.

Although the general average calculation is performed in the above example to form an averaged image, the averaging processing may be changed according to the process variations. More specifically, when the process variations generated as the number of measurements (number of samples) increases change sharply, it is expected that the gap between the averaged image and the actually acquired image will be increased if the image data acquired by an old measurement is used in the average calculation.

To address this problem, if the matching score between old image data (for example, image data of a pattern identified first by template matching or the first template (image data need not be the first image data but may be image data traced back a predetermined number of times)) and the current template (or current actual image) falls below a predetermined value, the processing is performed by excluding the old image data from the averaging processing. That is, if there is a matching rate gap between the template used in the previous or the pattern at the location identified by the matching based on that template and the currently used template or the pattern at the location identified by that template, the image data forming the previous template is excluded from the average calculation for creating a new template.

An increased difference between the initial template and so on and the current template and so on means that the pattern shape has changed greatly due to process variations.

In this case, one possible solution is to perform the averaging processing for the images acquired by a predetermined number of most recent measurements beginning with the current measurement and to eliminate the less recent images from the averaging processing. On the other hand, if there is an irregular variation in the matching scores corresponding to the number of measurements, one possible solution is to perform the averaging processing for all images. It is also possible to perform the averaging processing, not for all images, but for the images for a predetermined number of samples or measurements.

If the matching score becomes extremely small (for example, the matching score falls below a predetermined matching score), the formed pattern itself may have a problem. In this case, one possible solution is not to perform the averaging processing for the image of that pattern.

Second Embodiment

Figure 7:
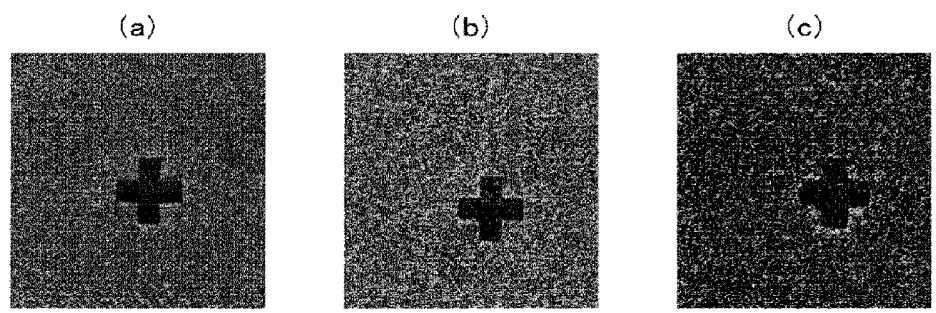
FIG. 7 is a diagram showing an example of a SEM image before the averaging processing and a SEM image after the averaging processing.

Next, FIG. 7 is a diagram showing an example of an averaged image created using a sample. FIG. 7(a) shows an averaged image 304 created by the averaged image creation unit 303 based on multiple images accumulated in the image data accumulation unit 302 shown in FIG. 3. FIG. 7(b) and FIG. 7(c) show raw images selected randomly from the multiple images accumulated in the image data accumulation unit 302.

It is apparent that the averaged image in FIG. 7(a), though similar to the raw image in FIG. 7(b), has lower noises than the raw data in FIG. 7(b). In addition, when an averaged image is created, a deformed pattern such as the one shown in FIG. 7(c) is sometimes included. It is desirable that an image to be registered as the template be an image that is not affected by a process variation such as the one shown in FIG. 7(c) and has high matching accuracy.

Figure 8:
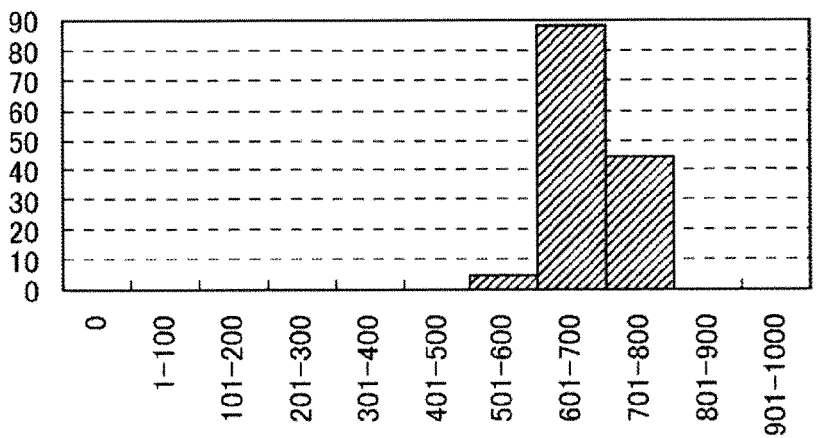
FIG. 8 is a diagram showing an example of the histogram showing matching scores between a template and SEM images.
Figure 8:
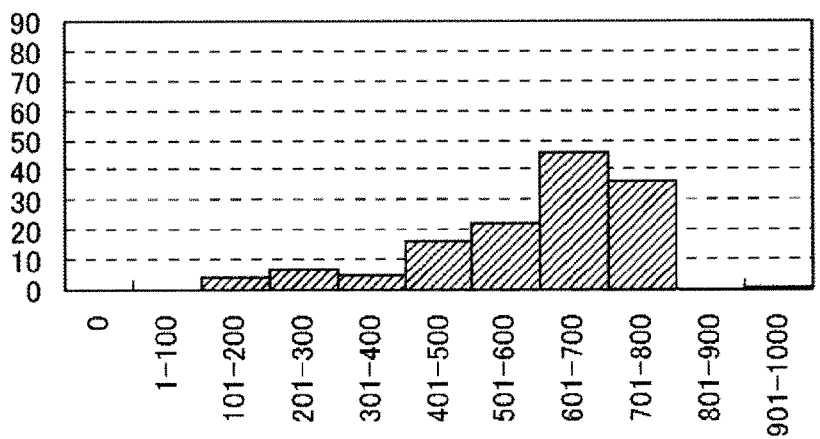
Figure 8:
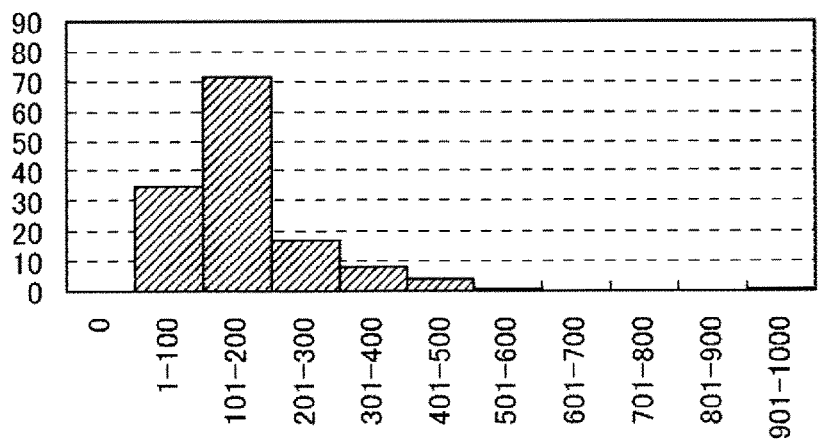

With each of the images in FIG. 7 registered as the template, FIG. 8 shows the result of matching accuracy checking for 100 images saved in the data accumulation unit 401. To check the matching accuracy, the scores are evaluated wherein the lower the rate of matching with the template is, the lower the score is, with the complete match being the score 1000. Each of the graphs in FIG. 8 is a histogram where the horizontal axis indicates the score value and the vertical axis indicates the number of occurrences. The graph indicates that the more occurrences are at the high-score positions, the better the image is as template.

FIG. 8(a) is a score evaluation graph when the averaged image in FIG. 7(a) is used as the template. Similarly, FIG. 8(b) and FIG. 8(c) are score evaluation graphs respectively when the SEM images in FIG. 7(b) and FIG. 7(c) are used as the template.

These graphs indicate that the distribution is concentrated around relatively high matching rates in FIG. 8(b), and around lower matching rates in FIG. 8(c). This means that the matching accuracy cannot be increased simply by registering a raw image as the template. In contrast, from the score evaluation graph of the averaged image in FIG. 8(a) created using the averaged image creation unit, it is confirmed that the distribution is concentrated around high matching rates and that the matching rate is higher than that in FIG. 8(b) where raw image is used.

In this way, the method described above allows a stable template to be created without decreasing the matching accuracy even if samples have process variations or layer differences.

REFERENCE SIGNS LIST

101 Cathode
102 First anode
103 Second anode
104 Primary electron beam
105 Condenser lens
106 Objective lens
107 Sample
108 Deflection coil
109 Deflection control device
110 Secondary electron
111 Secondary electron detector
112 Amplifier
113 Computer

The invention claimed is:

1. A template-matching template creation method in which a desired location is identified by comparing a template stored in advance and an image acquired by a microscope, said template-matching template creation method comprising steps of:
   accumulating a plurality of image data of a plurality of patterns formed under a same fabrication condition and at different fabrication timings, the plurality of image data having been acquired by said microscope, and the plurality of patterns having a same design;
   performing a template-matching process using a reference image and each of the accumulated plurality of image data of the plurality of patterns; and
   creating a template for template-matching by calculating an average of the plurality of image data of a predetermined number of patterns, locations of which are identified by the template-matching process while excluding old image data which has been used for the average calculation from the average calculation and including new image data of a pattern formed at a different fabrication timing in the average calculation.

2. The template-matching template creation method according to claim 1, further comprising a step of performing pattern edge emphasizing processing for the plurality of image data before calculating the average of the plurality of image data.

3. The template-matching template creation method according to claim 1, wherein the step of performing a template-matching process includes performing template-matching among the plurality of image data before calculating the average of the plurality of image data.

4. The template-matching template creation method according to claim 3, wherein information on a difference between image data, which is acquired during the template-matching, is saved and the step of calculating the average is performed for the image data based on the difference information.

5. The template-matching template creation method according to claim 1, wherein
   when there is a predetermined gap of matching rate between a previous template and a current template, image data for creating the previous template is not used as image data for creating a new template.

6. A template creation device that creates a template for identifying a desired location based on an image acquired by a microscope and based on a comparison with the microscope image, said template creation device comprising:
   a computer storing a program,
   wherein the program, when executed by the computer, causes the computer to function as:
   an image data accumulation unit in which a plurality of the microscope image data of a plurality of patterns formed under a same fabrication condition and at different fabrication timings are accumulated, the plurality of patterns having a same design;
   a template-matching process unit for performing a template-matching process using a reference image and each of the accumulated plurality of image data of the plurality of patterns; and
   a template creating unit for creating a template for template-matching by calculating an average of the plurality of microscope image data of a predetermined number of patterns, locations of which are identified by the template-matching process while excluding old microscope image data which have been used for the average calculation from the average calculation and including new microscope image data of a pattern formed at a different fabrication timing in the average calculation.

7. The template creation device according to claim 6, wherein the program, when executed by the computer, causes the computer to further function as: an image filtering unit that performs pattern edge emphasizing processing for the plurality of microscope image data before calculating the average of the plurality of microscope image data.

8. The template creation device according to claim 6, wherein the template-matching process unit performs template-matching among the plurality of microscope image data before calculating the average of the plurality of microscope image data.

9. The template creation device according to claim 8, wherein:
   said template-matching process unit saves information on a difference between microscope image data, which is acquired during the template-matching, and performs calculating the average for the microscope image data based on the difference information.

10. The template creation device according to claim 6, wherein:
    when there is a predetermined gap of matching rate between a previous template and a current template, said averaged image creation unit does not use microscope image data for creating the previous template as microscope image data for creating a new template.

* * * * *